Nov. 14, 1967        G. E. HART        3,353,182

RADIO POLARIZATION GUIDANCE SYSTEM

Filed April 14, 1966        4 Sheets-Sheet 1

INVENTOR
*GERALD E. HART*

BY *R. S. Sciascia*

ATTORNEY

ON AXIS VIDEO OUTPUT, 500 Kc. RATE ONLY, TRIGGER IS ACTUATED

FIG. 6A

OFF AXIS VIDEO OUTPUT, 500 Kc. RATE WITH STRONG 250 Kc. COMPONENT NO TRIGGER

INVENTOR
*GERALD E. HART*

BY

ATTORNEY

Nov. 14, 1967    G. E. HART    3,353,182
RADIO POLARIZATION GUIDANCE SYSTEM
Filed April 14, 1966    4 Sheets-Sheet 4

FIG. 8

INVENTOR
GERALD E. HART

BY
ATTORNEY

United States Patent Office 3,353,182
Patented Nov. 14, 1967

3,353,182
RADIO POLARIZATION GUIDANCE SYSTEM
Gerald E. Hart, Oxon Hill, Md., assignor to the United States of America as represented by the Secretary of the Navy
Filed Apr. 14, 1966, Ser. No. 543,768
23 Claims. (Cl. 343—102)

ABSTRACT OF THE DISCLOSURE

A radio polarization guidance system which produces linearly polarized radiation on a beam axis or along a desired glide path, elliptical polarization with one rotational sense when deviating in one direction from the beam axis or glide path, and elliptical polarization with the opposite rotational sense when deviating in the opposite direction from the beam axis or glide path.

---

The present invention relates generally to improvements in radio guidance systems and the like and more particularly to new and improved radio polarization guidance systems wherein a beam is produced that will uniquely define the deviation angle and the direction of deviation of a vehicle from a desired glide path.

In the field of radio guidance it has been the general practice to employ various systems, such as conical scanned beams with synchronizing signals, lobe switching beams which transmit precise angles as they scan, and narrow scanning beams which transmit precise angles as they scan. Although such devices have served the purpose, they have not proved entirely satisfactory under all conditions of service.

For example, a conical scanned beam with synchronizing signal involves the use of a mechanically rotating antenna or feed system which involves wear and maintenance problems and which may also involve vibration problems. In addition, this type of system requires some form of integration or memory process throughout the duration of each scan; and receiver synchronization is also required. In a lobe switching beam system the two lobes must time share, and some form of storage must be employed in the receiver to permit amplitude comparison between the two lobe signals. In addition, because of the switching of lobes which is required, the beam cannot be a monopulse. A narrow scanning beam which transmits precise angles as it scans requires a transmitting antenna with a large aperture in order to produce the narrow beam, and it is mechanically difficult to scan such a large antenna at a rate of five to ten times per second.

The general purpose of this invention is to provide a radio polarization guidance system which embraces all the advantages of similarly employed guidance systems and possesses none of the afore described disadvantages. To attain this the present invention contemplates a unique antenna arrangement which produces linearly polarized radiation on beam axis or along the desired glide path, elliptical polarization with one rotational sense when deviating in one direction from the beam axis or glide path, and elliptical polarization with the opposite rotational sense when deviating in the opposite direction from the beam axis or glide path.

An object of the present invention is the provision of a radio polarization guidance system which uniquely provides position information.

Another object is to provide a radio polarization guidance system which transmits a beam that will uniquely define the deviation angle and the direction of deviation from a reference plane in a single pulse or in an unmodulated continuous wave signal.

A further object of the invention is the provision of a radio polarization guidance system which provides position information without regard to the axial rotation or orientation of receiving antennas.

Still another object is to provide the above-mentioned system that will operate without resort to mechanical devices for scanning either in the transmitter or the receiver, thus eliminating the mechanical wear and maintenance.

Yet another object of the present invention is the provision of a guidance system which provides for the operation of vertical and horizontal guidance beams independently of one another and at different locations, if desired.

A still further object of the invention is the use of two orthogonal, linearly-polarized waves to measure the angle of deviation from the transmitting-array axis, or beam-axis plane, by the triangulation method, in which path difference to two radiating elements is measured as a function of phase difference, phase difference, in turn, is measured as a function of the ellipticity of the composite electric field, and ellipticity, in turn, is measured as a function of the ratio between the right-hand and left-hand circularly-polarized components of the received signal.

With these and other objects in view, as will hereinafter more fully appear, and which will be more particularly pointed out in the appended claims, reference is now made to the following description taken in connection with the accompanying drawings in which:

Figure 1:
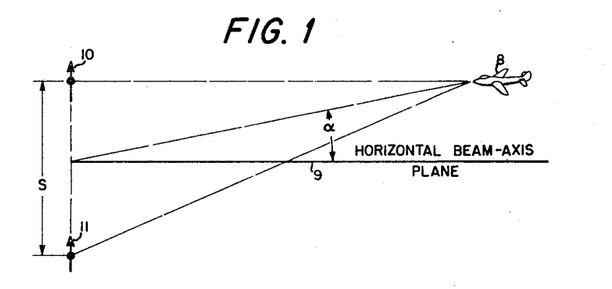
FIG. 1 shows a side elevation of the radiating antenna elements of one embodiment of the invention and their relationship to a vehicle which is being guided thereby.

Referring now to the drawings, wherein like reference characters designate like or corresponding parts throughout the several views, there is shown in FIG. 1, two orthogonally-oriented, linearly-polarized, radiating antenna elements, 10 and 11, displaced vertically by a distance S and fed in phase, with energy of equal amplitude in such a way as to act as a guidance system for the vehicle 8. The two radiating elements are on a line which is perpendicular to the beam-axis plane 9, which is shown in a horizontal orientation, but which would normally be inclined at an angle to the horizontal to coincide with a desired glide path. Normally, two beams are required to provide guidance not only in a vertical direction, but also in a horizontal or lateral direction.

The object of the antenna arrangement is to produce linearly-polarized radiation on axis, elliptical polarization with one rotational sense, when deviating in one direction from the beam-axis plane 9, and elliptical polarization with the opposite rotational sense, when deviating in the opposite direction. The ellipticity ratio of the radiation will become progressively smaller as the deviation angle from the beam-axis plane 9 is increased until it reaches the limiting value of one for circular polarization. Between the limits of left-hand circular polarization in one direction, and right-hand circular polarization in the opposite direction, the deviation angle, $\alpha$, is uniquely related to the right-hand and left-hand circular components of the electrical field vector by the following expression:

$$\sin \alpha = \lambda \cot^{-1} \frac{\frac{E_{RH}}{E_{LH}}+1}{\frac{E_{RH}}{E_{LH}}-1} \quad -90° \leq \phi \leq 90°$$

where $\phi$ is the phase angle between the electric field vectors of energy radiated from the two antenna elements
$\lambda$ is wavelength
S is the spacing between radiating elements
$E_{RH}$ is the right-hand component of elliptically polarized radiation
$E_{LH}$ is the left-hand component of elliptically polarized radiation.

Figure 2:
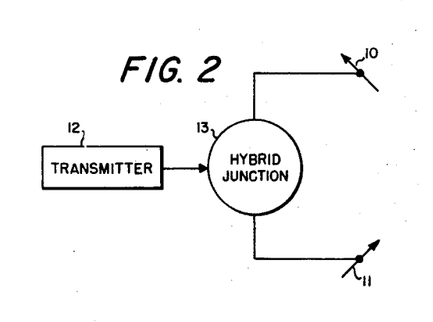
FIG. 2 illustrates a block diagram of the transmitter-portion of one embodiment of the invention.

With reference to FIG. 2, transmitter 12 feeds hybrid junction 13 which, in turn, is operatively coupled to the orthogonally oriented radiating antenna elements 10 and 11.

Figure 3:
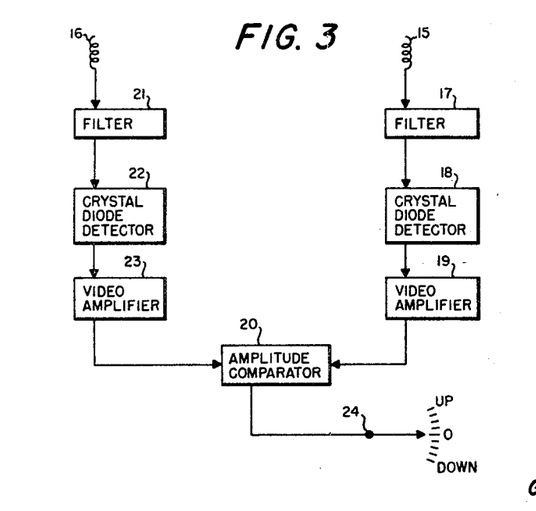
FIG. 3 shows a block diagram of the receiver-portion of one embodiment of the invention.

Referring now to FIG. 3 there is shown the basic airborne receiver of this invention which contains two receiving channels, one connected to the right-hand, circularly-polarized antenna 15 and the other to the left-hand, circularly-polarized antenna 16. The channel associated with the right-hand, circularly-polarized antenna 15 comprises filter 17, crystal detector 18, e.g. a diode, and video amplifier 19 all of which are coupled with respect to one another and with respect to antenna 15. The output of video amplifier 19, in turn, feeds amplitude comparator 20. The receiving channel associated with left-hand circularly-polarized antenna 16 comprises filter 21, crystal detector 22, and video amplifier 23 all of which are operatively coupled with respect to one another and with respect to antenna 16. The output of video amplifier 23, in turn, feeds amplitude comparator 20. The difference between the signal amplitudes in the two receiving channels is determined in amplitude comparator 20, the output of which actuates the indicator 24. Whether the indication is up or down depends on whether the maximum signal level is in the right-hand or left-hand channel as more fully explained hereinafter, and the indicator can be calibrated directly in degrees of deviation angle on the basis of the relationship in the above-mentioned equation within the limits of $\pm 90°$ for $\phi$, where $\phi$ is the phase angle between radiation from antenna elements 10 and 11 at vehicle 8.

In the operation of the embodiment of the invention shown in FIGS. 1–3, the two orthogonally-oriented antenna elements 10 and 11 are fed in phase with equal amplitude energy by transmitter 12 through hybrid junction 13 in such a way that each element radiates linearly polarized waves which are orthogonally oriented with respect to each other, and the resultant of which is oriented perpendicularly to the beam-axis plane 9.

It is apparent, from FIG. 1, that the path distance from the vehicle 8 to antenna element 11 is greater than the path distance from the vehicle 8 to antenna element 10. This difference in path distance will cause the electric field vector of energy radiated from antenna element 11 to lag that radiated from element 10 when the energy from both elements reaches the vehicle. With the antenna elements oriented as shown in FIG. 2, it is clear that the direction of rotation of the resultant electric field vector will be clockwise (or right-hand) when the electric field vector from element 11 lags the electric field vector from element 10.

Conversely, it can be seen that when the vehicle 8 is located on the opposite side of the beam-axis plane 9 from that shown in FIG. 1 the path distance from the vehicle to antenna element 11 will be less than that from the vehicle to antenna element 10, and as a result, the electric field vector of the energy radiated from antenna element 11 will lead the electric field vector of energy radiated from element 10 when the energy from both elements reaches the vehicle. The resultant electric energy field vector will then rotate in a counter-clockwise (or left-hand) direction.

Because the path distance from both of the elements 10 and 11 to any point on the beam-axis plane 9 are equal, the electric field vectors of the energy radiated from the elements 10 and 11 are in phase at any point on the beam-axis plane, and this results in a linearly polarized electric field vector within the beam-axis plane 9.

Therefore, depending upon the distance and the direction of deviation from the beam-axis plane, the electric field vectors from the elements 10 and 11 will lag or lead each other by varying amounts so as to result in right-hand elliptically polarized radiation on the side of the beam-axis plane nearest to element 10 and left-hand elliptically polarized radiation on the side of the beam-axis plane nearest to element 11.

As the distance from the beam-axis plane increases, the right-hand elliptically polarized radiation reaches a limit where it becomes right-hand circularly polarized radiation and the left-hand elliptically polarized radiation reaches a limit where it becomes left-hand circularly polarized radiation.

It is apparent that ambiguous readings are possible, both with respect to deviation angle and to direction, and so the limits for nonambiguous readings must be well defined. The limits for nonambiguous readings of deviation angle, $\alpha$, are listed in the above-mentioned equation as $(-90° \leq \phi \leq 90°)$. This means that the phase angle, $\phi$, between the fields radiated from antennas 10 and 11 can fluctuate between $-90°$ and $+90°$. This is obvious from the fact that a phase difference of 90° produces circular polarization, and increasing the phase difference to $\pm 180°$ will cause the ellipticity ratio, $\epsilon$, to repeat (in reverse direction) the entire range of ellipticity ratios, from 1 to infinity, that were covered in the first $\pm 90°$. Since $\phi$ is proportional to the length of the base line, S, it is apparent that for a given deviation angle $\alpha$, and a given wave length $\lambda$, S becomes the limiting factor.

If the desired sensitivity in deviation angle cannot be obtained from a single beam, it is possible to use two or more transmitting systems with different lengths of base line, S, so that one acts as a vernier for the other. A good rule of thumb is to make base line lengths differ by a factor of eight. An 8–1 ratio for S will cause the ratio between right and left circular signals for the longer value of S to reach infinity (i.e. circular polarization) at the same time that the signal ratio for the shorter value reaches 1.75 db, and this cross-over point should provide good accuracy all the way.

The limits for non-ambiguous readings of deviation sense (or direction), are reached when the phase angle, $\phi$, between the fields radiated from antenna elements 10 and 11 has reached $\pm 180°$. This phase difference is just twice that of nonambiguous readings of deviation angle. It is explained by the fact that, when the phase delay of element 11 exceeds 180°, it is no longer lagging but is actually leading; and when one of two electric field vectors changes from lagging to leading, the direction of rotation is reversed.

The basic airborne receiver of this invention is shown in FIG. 3. In the event that this airborne receiver is located above the beam-axis plane 9, as shown in FIG. 1 by vehicle 8, the radiation which it receives from the elements 10 and 11 will be right-hand elliptically polarized and this elliptically polarized radiation will be comprised of two components, i.e., a strong right-hand circularly polarized electric field vector and a weaker left-hand circularly polarized electric field vector, depending upon the degree of ellipticity of the radiation. A weak left-hand component would be present in the radiation out to the limit of right-hand circular polarization where there would be no left-hand circular component.

Conversely, in the event that the receiver is located below the beam-axis plane 9 of FIG. 1, the radiation which it receives from the elements 10 and 11 will be left-hand elliptically polarized and the elliptically polarized radiation will be comprised of two components, i.e. a strong left-hand circularly polarized electric field vector and a weaker right-hand circularly polarized electric field vector, depending upon the degree of ellipticity of the radiation. A weak right-hand component would be present in the radiation out to the limit of left-hand circular polarization where there would be no right-hand circular component.

The basic airborne receiver in FIG. 3 receives right-hand circularly polarized radiation components with the right-hand circularly-polarized antenna 15 and, conversely, the left-hand circularly-polarized antenna 16 receives left-hand circularly-polarized radiation components. The signals received by the antenna elements 15 and 16 are directed through the filters 17 and 21, respectively, where extraneous frequencies and noise are removed from the signals. The resulting signals are then rectified by crystal detectors 18 and 22, respectively, and, in turn, are amplified by video amplifiers 19 and 23. The outputs of the video amplifiers 19 and 23 act as inputs to amplitude comparator 20, the output of which actuates the indicator needle 24.

Whether the indication is "UP" or "DOWN" depends on whether the greatest signal level is in the right-hand channel or the left-hand channel, and the indicator is calibrated directly in degrees of deviation angle on the basis of the relationship in the above-mentioned equation within the limits of $\pm 90°$ for $\phi$.

Thus, it can be seen that when the receiver of FIG. 3 is located above the beam-axis plane 9, where the right-hand circular component of the right-hand elliptically polarized radiation is greater than the left-hand circular component, a stronger signal will be received in the right-hand channel of the receiver which is associated with antenna 15, than will be received in the left-hand channel, which is associated with antenna 16, and the indicator needle 24 will indicate an "UP" position.

Conversely, when the receiver is located below the beam-axis plane 9, where the left-hand circular component of the left-hand elliptically polarized radiation is greater than the right-hand circular component, the indicator needle 24 will indicate a "DOWN" position, since a stronger signal will be received by antenna 16.

It should be clear that one of the advantages of this invention over the prior art is the fact that the axial rotation of the circularly-polarized antennas 15 and 16 will not affect the accuracy or reliability of the positional data received by the receiver. In prior art systems, however, linearly polarized radiation in various planes have been used to indicate the direction and extent of deviation from a reference region. But, contrary to this invention, the receiving antennas used in the prior art have been required to be oriented and maintained in a fixed spatial position in order to indicate correctly the direction and extent of deviation from such a reference region.

Figure 4:
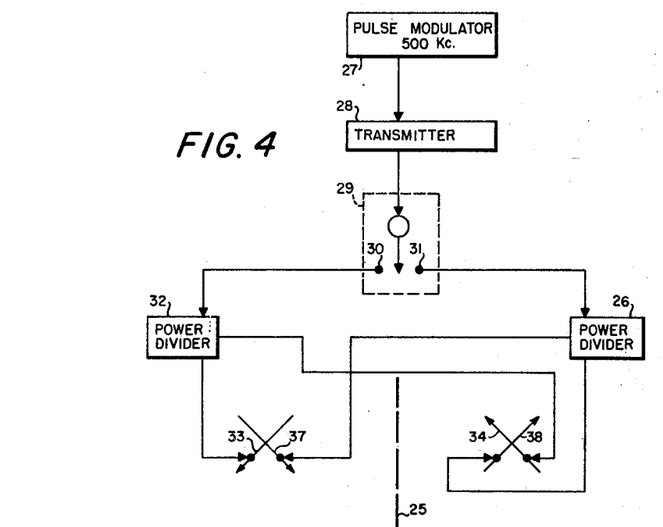
FIG. 4 is a block diagram of the transmitter-portion of another embodiment of the invention.
Figure 5:
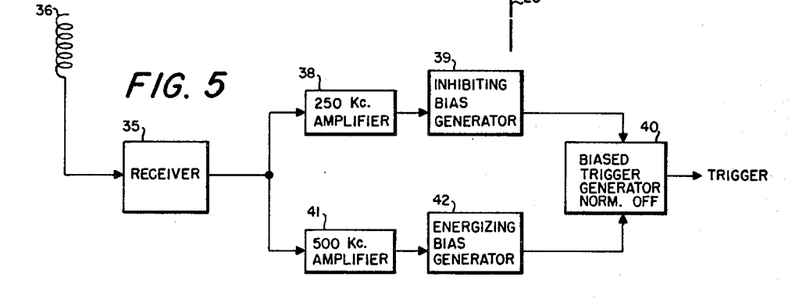
FIG. 5 is a block diagram of the receiver-triggering apparatus which is associated with the apparatus of FIG. 4.

Another embodiment of this system is shown in FIGS. 4 and 5, wherein FIG. 4 shows the transmitter-portion of the system for providing guidance in a lateral direction which comprises a pulse modulator 27 coupled to transmitter 28. The transmitter 28 is, in turn, connected to a radio-frequency type switch 29, e.g. a crystal diode type switch, which includes two poles 30 and 31. Coupled to the pole 30 is power divider 32 which is connected to a pair of orthogonally oriented radiation elements 33 and 34. A second power divider 26 is connected to pole 31 of switch 29, and in turn, the power divider 36 is coupled to a pair of orthogonally-oriented radiating elements 37 and 38.

Figure 6A:
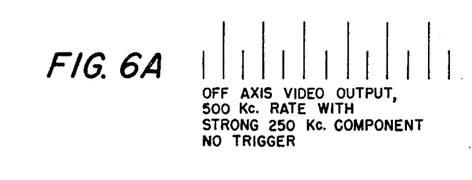
FIGS. 6A and 6B illustrate the inputs to the receiver-triggering apparatus of FIG. 5.
Figure 6B:
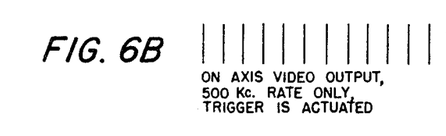

The receiver and triggering-portion of this embodiment of the invention is shown in FIG. 5 and the various signal inputs to the antenna of this triggering-portion are represented in FIGS. 6A and 6B. In FIG. 5, an antenna 36, which may be either a right-hand or a left-hand circularly polarized antenna is coupled to a receiver 35. The receiver output is connected to two parallel branches, each branch comprising an amplifier having a bias generator coupled to its output. For example, amplifier 38, which is tuned to pass one particular frequency band, e.g. around 250 kc., is coupled to bias generator 39, the output of which is connected to a biased trigger generator 40. The other parallel branch comprises amplifier 41, which is tuned to pass one particular frequency band, e.g. around 500 kc. The output of amplifier 41 is connected to the input of bias generator 42, the output of which, in turn, is coupled to biased trigger generator 40.

In the operation of this embodiment of the invention, shown in FIGS. 4 and 5, the pulse modulator 27 is set to a particular frequency, e.g. 500 kc. The modulator feeds transmitter 28 which then energizes the R–F switch 29, which in turn is set to switch at a desired frequency, e.g. 250 kc.

When the switch 29 energizes the pole 30, the power divider 32 is also energized, thus activating the set of antenna elements 33 and 34 with in-phase electrical power of equal amplitudes. Similarly, when the switch 29 energizes the pole 31 the power divider 26, rather than the power divider 32, is activated, thus energizing the set of antenna elements 37 and 38 with electrical power which is in phase and of equal amplitudes. The set of elements 33 and 34 are oriented at 90° with respect to the set of antennas 37 and 38, respectively, so that resultant radiation of each set is oriented perpendicularly to the beam-axis plane 25.

Because the antenna elements 33 and 34 are orthogonally oriented with respect to each other, and because they are fed in phase and with power of equal amplitudes, the radiation along the beam-axis plane 9 of FIG. 1, which is located an equal distance from each of the elements 33 and 34, is linearly polarized and is composed of two equal-amplitude, circularly-polarized components, one right-hand circularly polarized component and one left-hand circularly polarized component.

At points located away from the vertical beam-axis plane 25 and on the side closer to the element 33 than to the element 34 the radiation will be right-hand ellipitically polarized out to a limited distance from the beam-axis plane where the radiation will be right-hand circularly polarized. This is because the phase of the radiation from element 33 will lead that from element 34, and as a result this radiation will be comprised of two circularly and oppositely polarized components where the right-hand circular component has a greater amplitude than the left-hand circular component.

Conversely, at points located away from the vertical beam-axis plane 25 and on the side closer to element 34 the radiation will be left-hand elliptically polarized out to a limited distance from the beam-axis plane where the radiation will be left-hand circularly polarized. As a result this radiation will be comprised of two circularly and oppositely polarized components where the left-hand circular component has a greater amplitude than the right-hand circular component.

When the orthogonally-oriented antenna elements 37 and 38 each are activated by electrical power which is in phase and of equal amplitude the radiation along the vertical beam-axis plane 25 is linearly polarized and is comprised of two equal-amplitude, circularly-polarized components, one right-hand and one left-hand component.

At points away from the beam-axis plane 25 and on the side closer to the element 37 the radiation will be left-hand elliptically polarized out to a limited distance from the beam axis plane where the radiation will be left-hand circularly polarized. This is because the phase of the radiation from element 37 will lead that from element 38, and as a result this radiation will be comprised of two circularly and oppositely polarized components where the left-hand component has a greater amplitude than the right-hand component. Conversely, at points located away from the beam-axis plane 9 and on the side closer to element 38 the radiation will be right-hand elliptically polarized out to a limited distance from the beam-axis plane where the radiation will be right-hand circularly polarized. As a result this radiation will be comprised of two circularly and oppositely polarized components where the right-hand component has a greater amplitude than the left-hand component.

Whether the receiver and triggering apparatus of FIG. 5 is located to one side or the other of the beam-axis plane 25, which plane is associated with the transmitting apparatus of FIG. 4, the radiation received by the antenna 36 of the triggering apparatus will be that represented in FIG. 6A. If, for example, the antenna 36 were a left-hand, circularly-polarized antenna, located on one side or the other of the beam-axis plane, it would alternately receive right-hand elliptically polarized radiation and left-hand elliptically polarized radiation depending upon which set of radiating elements 33–34 or 37–38 were energized by the action of the switch 29.

When the left-hand circularly-polarized antenna 36 receives a pulse of left-hand elliptically polarized radiation, which is comprised of a dominant left-hand circularly polarized component, this strong signal component energizes receiver 35. On the other hand, when the antenna 36 receives a pulse of right-hand elliptically-polarized radiation, which has a dominant right-hand circularly polarized component and a weaker left-hand component, this weaker signal component energizes the left-hand circularly-polarized antenna 36 and receiver 35. As a result the output of the receiver would be represented by the waveform shown by FIG. 6A, which has a 250 kc. component, in addition to the basic 500 kc. component.

The 250 kc. component would be amplified by frequency-selective amplifier 38 but not by the frequency-selective amplifier 41, and the inhibiting bias generator 39 would be energized which, in turn, would bias the trigger generator 40 to an "OFF" condition which is its normal state.

The inhibiting bias generator 39 acts to inhibit the biased trigger generator 40 at all times when a 250 kc. component is present in the receiver signal. The 500 kc. component would be amplified by the amplifier 41, which would activate the energizing bias generator 42 but the signal of the bias generator 39 would maintain the biased trigger generator in an "OFF" condition.

When the triggering apparatus of FIG. 5 is located within the beam-axis plane 9, which plane is defined by linear radiation from the transmitting apparatus of FIG. 4, the radiation received by the left-hand circularly-polarized antenna 36 will be represented by FIG. 6B.

The antenna 36 when located on the beam-axis plane 9 would receive linearly-polarized radiation no matter which set of radiating elements 33–34 or 37–38 were energized by the action of switch 29. This linearly-polarized radiation from either set of radiating elements 33–34 or 37–38 would be comprised of equal-amplitude right-hand and left-hand circularly-polarized components, and the left-hand, circularly-polarized antenna 36 would receive pulses of equal-amplitude, left-hand, circularly-polarized radiation no matter which set of antenna elements 33–34 or 37–38 were energized, as is illustrated in FIG. 6B, which shows the resultant 500 kc. component of the output of receiver 35.

This 500 kc. component would be amplified by the frequency-selective amplifier 41 but not by amplifier 38, which is set to pass modulation components only very near 250 kc. The bias generator 42 would then be energized which, in turn, would bias the trigger generator 40 to an "ON" condition, which would actuate the triggering of an event or action in the vehicle containing the triggering apparatus. The triggering action could activate such things as a transponder reply or the firing of retro rockets in a space capsule.

It should be understood that the beam-axis plane 25, although described as being vertically oriented, could be oriented in any manner desired depending upon the locations of the radiating elements 33–34 and 37–38.

Figure 7:
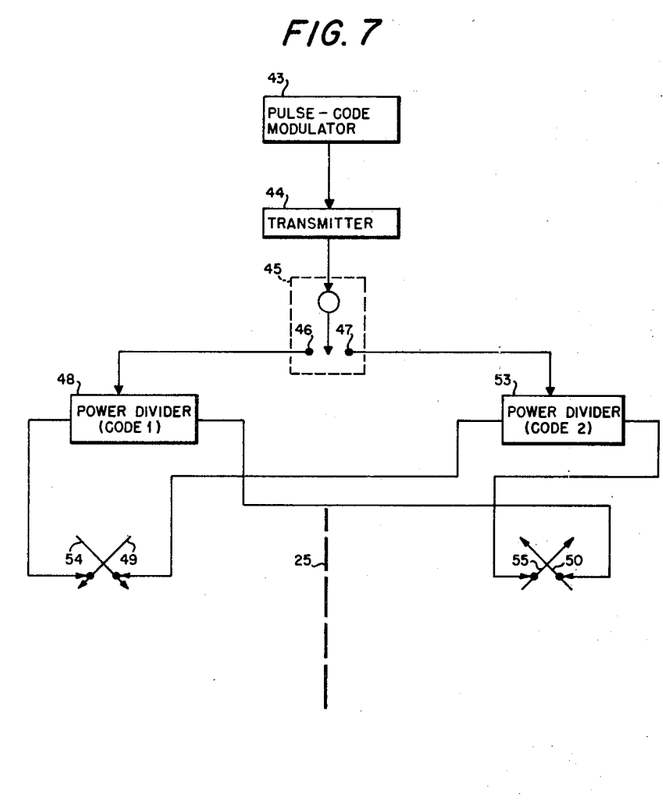
FIG. 7 is a part of the transmitter-portion of still another embodiment of the invention.
Figure 8:
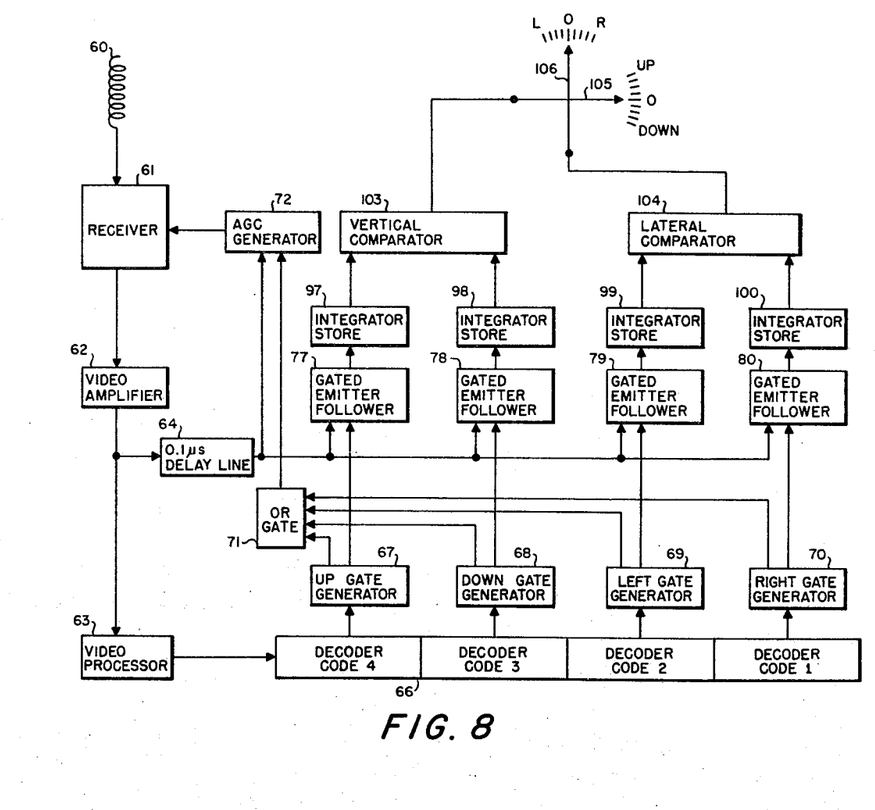
FIG. 8 shows the receiver and indicator portion associated with the system and apparatus of FIG. 7.

Still a third embodiment of this radio polarization guidance system is shown in FIGS. 7 and 8, wherein FIG. 7 shows that part of the transmitter-portion of the system for providing guidance in a lateral direction. A similar, but separate, transmitter-portion (not shown) is also a part of this system, and it provides guidance in a vertical direction.

The transmitter-portion of FIG. 7 comprises a pulse-code modulator 43 coupled to transmitter 44 which is, in turn, connected to a radio-frequency type switch 45, e.g. a crystal diode type switch, which includes two poles 46 and 47. Coupled to the pole 46 is power divider 48 which is connected to a pair of orthogonally-oriented, laterally-spaced radiating elements 49 and 50. A second power divider 53 is connected to pole 47 of switch 45, and in turn, the power divider 53 is coupled to a pair of orthogonally-oriented, laterally-spaced radiating elements 54 and 55.

It is to be clearly understood that another transmitting apparatus (not shown) similar to that shown in FIG. 7 also is to be employed in this embodiment of the invention. The transmitting apparatus, which is not shown, will provide a vertical guidance beam, i.e. a beam providing guidance information in a vertical direction, while that shown in FIG. 7 will provide a horizontal or lateral guidance beam.

The receiver-portion of this embodiment of the invention is shown in FIG. 8. A single, left-hand circularly-polarized antenna 60 is coupled to receiver 61, the output of which acts as the input to video amplifier 62. The output of amplifier 62 is divided, with one portion acting as the input to video processor 63, and the other portion being diverted through a delay line 64, which for the purposes of this invention is set to delay a signal by 0.1 microsecond.

The video processor 63 is coupled to the four-code decoder 66, which has four separate outputs connected to "UP" gate generator 67, "DOWN" gate generator 68, "LEFT" gate generator 69, and "RIGHT" gate generator 70. Each of these gate generators has one output to "OR" gate 71, which in turn, is connected to the automatic gain control generator 72, the output of which is coupled to the receiver 61.

Each of the gate generators 67–70 has an output which is connected to one of the gated emitter followers 77–80, respectively; and in addition, the delay line 64 is coupled to each of the gated emitter followers 77–80, and also to the automatic gain control generator 72.

Integrator stores 97–100 are individually connected to the outputs of gated emitter followers 77–80, respectively; and the outputs of integrator stores 97 and 98 are coupled to vertical comparator 103, while the outputs of integrator stores 99 and 100 are coupled to lateral comparator 104. The vertical comparator 103 is, in turn, mechanically connected to indicator needle 105, and the lateral comparator 104 is mechanically connected to indicator needle 106.

In the operation of the embodiment of the invention disclosed in FIGS. 7 and 8, pulse-code modulator 43 produces two separate and time sharing codes which in turn are introduced into the transmitter 44. The time-sharing coded signals are then fed into radio-frequency switch 45, which has a switching frequency such that one code is being transmitted when the switch is in contact with pole 46 and the other code is being transmitted when the switch is in contact with pole 47.

When the switch 45 activates the pole 46 one of the coded signals is fed through the power divider 48 and in turn to the radiating elements 49 and 50. When the switch 45 activates the pole 47 the second coded signal is fed through power divider 53 and in turn to radiating elements 54 and 55.

Each of the radiating element pairs 49–50 and 54–55 are thus energized on a time-sharing basis. That is, when the pole 46 is activated the radiating element pair 49–50 is activated and the radiating element pair 54–55 is not activated. Similarly, when the pole 47 of switch 45 is activated the radiating element pair 54–55 is energized and the radiating element pair 49–50 is inactivated.

The radiating elements 49 and 50 when energized are fed in phase with equal amplitude signals as are the radiating elements 54–55 when they are energized. Thus any point in the beam-axis plane 25 which is an equal distance from the radiating element pairs will be illuminated by linearly polarized radiation which is oriented perpendicularly to the beam-axis plane 25.

If a vehicle (not shown) approaching the transmitting apparatus of FIG. 7 were located a distance from the beam-axis plane 25 and at a point closer to the radiating elements 49 and 54 than to the radiating elements 50 and 55, it would be illuminated alternately by a right-hand elliptically-polarized wave for one portion of time and by a left-hand elliptically-polarized wave for another portion of time, depending upon whether pole 46 or the pole 47 of switch 45, respectively, is activated. This can more easily be seen if FIG. 7 is considered as a front view of the transmitting apparatus. With this in mind and assuming that pole 46 of the switch 45 is activated it can be seen that the radiation from element 49 will lead that radiation from element 50 as it reaches the vehicle (not shown) in such a way as to result in a right-hand elliptically-polarized wave out to a distance from the beam-axis plane 25 where right-hand circularly-polarized radiation would result. Conversely, when the pole 47 of switch 45 is activated the radiation from element 54 will lead the radiation from element 55 as it reaches the vehicle thus resulting in a left-hand elliptically polarized wave out to a distance from the beam-axis plane 25 where left-hand circularly-polarized radiation would result.

Were the vehicle (not shown) located a distance from the beam-axis plane 25 and closer to the radiating elements 50 and 55 than to the elements 49 and 54, the vehicle would be illuminated alternately by left-hand elliptically-polarized radiation and by right-hand elliptically-polarized radiation. If the pole 46 of switch 45 were energized the radiation from element 50 would lead the radiation from element 49 thus resulting in a left-hand elliptically-polarized wave out to a distance from the beam-axis plane 25 where left-hand circularly-polarized radiation would result. Conversely, when the pole 47 of switch 45 is activated the radiation from element 55 would lead the radiation from element 54 thus resulting in a right-hand elliptically-polarized wave out to a distance from the beam-axis plane 25 where right-hand circularly polarized radiation would be present.

Assuming that the receiving and indicating system of FIG. 8 is located in a vehicle (not shown) approaching the transmitting apparatus of FIG. 7, and assuming that the antenna 60 in FIG. 8 is a left-hand circularly-polarized antenna, the receiving and indicating apparatus of FIG. 8 will represent the vehicle's position from the beam-axis plane 25 which is located an equal distance between the radiating element pairs 49–50 and 54–55. When the vehicle containing the receiving and indicating apparatus of FIG. 8 is located along the beam-axis plane 25 of FIG. 7 the antenna 60 which is a left-hand circularly-polarized antenna will be illuminated by linearly polarized radiation which will be transmitted with one code when the elements 49 and 50 are energized and with another code when the elements 54 and 55 are energized.

As is well known a linearly-polarized wave is composed of two circularly-polarized components e.g. one right-hand circularly-polarized component which is equal in amplitude to the other left-hand circularly-polarized component. Thus, when the antenna 60 is located within the beam-axis plane 25 of FIG. 7 it is illuminated for one time period by the coded signal radiated from elements 49 and 50, which coded signal we shall call code 1. The left-hand circularly-polarized component of the linear radiation is received by the left-hand circularly-polarized antenna 60 while the right-hand circularly-polarized component of the linear radiation from element 49 and 50 is not received by the antenna 60.

Similarly, when the radiating elements 54 and 55 are energized, the differently coded signal radiating from elements 49 and 50 is transmitted, which coded signal we shall call code 2. Thus, when the left-handed circularly-polarized antenna 60 is located on the beam-axis plane 25 of FIG. 7 it will be illuminated for another time period by a linearly-polarized wave which is transmitted at code 2. This linearly-polarized wave is composed of both a right-hand and a left-hand circularly-polarized component which are equal in amplitude. As a result, the left-hand circularly-polarized antenna 60 will receive the left-hand circularly-polarized component which is transmitted at code 2 alternately with the left-hand circularly-polarized component which is transmitted at code 1.

It can be seen, therefore, that the left-hand circularly-polarized antenna 60, when located on the beam-axis plane 25 of FIG. 7, receives on a time sharing basis a left-hand circularly-polarized wave form component transmitted at code 1 and then a left-hand circularly-polarized wave form component transmitted at code 2, both of which are of equal amplitude.

When the code 1 signal illuminates the antenna 60 it is, in turn, fed through the receiver 61 and into the video amplifier 62. A portion of the output signal of the video amplifier 62 is directed through the delay line 64 while the other portion of the signal is fed through the video processor 63 which produces a more readily definable wave form which is free from extraneous signals.

The output of the video processor 63 is then fed into the four-code decoder 66. If the signal received by the antenna 60 is a code 1 signal, the code 1 decoder passes the signal into right gate generator 70. The output produced by the right gate generator 70 acts as an input to gated emitter follower 80. In addition, the output of the video amplifier 62 which has been delayed by the delay line 64 also acts as an input to the gated emitter follower 80. The gate produced by right gate generator 70 and the signal from the delay line 64 coincide with each other with respect to time and act simultaneously to energize the gated emitter follower 80 which in turn feeds the integrator store 100, which is a memory device capable of storing the signal output of the gated emitter follower for a relatively long period of time.

When the left-hand circularly-polarized component of radiation transmitted by code 2 is received by the left-hand circularly-polarized antenna 60, it is also fed through the receiver 61, the video amplifier 62, the delay line 64, the video processor 63, and from the video processor 63 into the decoder 66. Because the signal received by the antenna 60 is a code 2 signal it passes through the decoder for code 2 and then to the left gate generator 69. The gate generator 69 produces a gate which, simultaneously with a signal from the delay line at 64, energizes the gated emitter follower 79. The gated emitter follower 79 in turn feeds the integrator store 99.

The outputs of the integrator stores 99 and 100 are then fed into the lateral comparator 104 which compares the amplitudes of the signals from the integrator stores 99 and 100. The lateral comparator 104 is mechanically connected to the indicator needle 106 which is calibrated according to the above-mentioned equation to give a direct reading of the sense and the amount of deviation from the beam-axis plane 25 of FIG. 7. In this case, where the vehicle containing the apparatus of FIG. 8 is located on the beam-axis plane 25, the amplitudes of the signals fed into the lateral comparator 104 are equal, and the indicator needle 106 will be centered to indicate that the vehicle is located on the beam-axis plane.

When the vehicle (not shown) containing the receiver-indicating apparatus of FIG. 8 is located more closely to the radiating elements 49 and 54 than to the radiating elements 50 and 55, the left-hand circularly-polarized antenna 60 will be alternately illuminated by right-hand elliptically-polarized radiation when code 1 is being transmitted from elements 49 and 50 and left-hand elliptically polarized radiation when code 2 is being transmitted from elements 54 and 55. The right-hand elliptically-polarized radiation of code 1 is composed of two circularly-polarized components, e.g. one left-hand circularly-polarized component and one right-hand circularly-polarized component wherein the right-hand circularly-polarized component is of a magnitude greater than the left-hand circularly-polarized component. The left-hand elliptically-polarized radiation of code 2 is composed of two circularly-polarized components, e.g. one right-hand circularly-polarized component and one left-hand circularly-polarized component, wherein the magnitude of the left-hand component is greater than the magnitude of the right-hand component.

During the time when code 1 is being transmitted, therefor, the small magnitude left-hand circularly-polarized component of the radiation is received by the left-hand circularly-polarized antenna 60. The energy from this small left-hand circularly-polarized component is then fed through the receiver 61, video amplifier 62, with a portion of video amplifier output being diverted through the delay line 64 and the remainder being fed through the processor 63. The energy is distinguishable because it is code 1 energy and it is fed through decoder 66 and into right gate generator 70. The gate produced by gate generator 70 combines simultaneously in time with the output of delay line 64 to form the input to gated emitter follower 80, the output of which is fed into integrator store 100.

When code 1 ceases to be transmitted and code 2 is transmitted a strong magnitude left-hand circularly polarized component and a weak right-hand circularly-polarized component illuminate antenna 60. Because the antenna 60 is a left-hand circularly-polarized antenna it receives the strong component which is left-hand circularly-polarized. The energy from this component, in turn, is fed through receiver 61, video amplifier 62, with a portion going through delay line 64 and the remainder going through video processor 63. The output of video processor 63 is fed into the decoder 66, and only the decoder for code 2 allows the code 2 signal to pass. The output of the code 2 portion of decoder 66 is fed into left gate generator 69, the output of which feeds the gated emitter follower 79 in conjunction with the output of delay line 64. The strong signal is then fed into the integrator store 99.

At this point, the output of integrator stores 100 and 99 are fed into the lateral comparator 104, which compares the strong signal of integrator store 99 with the weak signal of integrator store 100. Indicator needle 106 is mechanically coupled to the lateral comparator 104 in such a way as to indicate directly the vehicle's leftward deviation from the beam-axis plane 25 shown in FIG. 7.

Conversely, when the vehicle containing the receiver-indicator apparatus of FIG. 8 is located to the right of the beam-axis plane 25 of FIG. 7, that is at a point closer to the radiating elements 50 and 55 than to the radiating elements 49 and 54, the left-hand circularly-polarized antenna 60 will be illuminated alternately by left-hand elliptically-polarized radiation when code 1 is being transmitted from radiating elements 49 and 50 and then by right-hand elliptically-polarized radiation when code 2 is being transmitted from radiating elements 54 and 55. The left-hand elliptically-polarized radiation of code 1 is composed of two circularly-polarized components, e.g. one right-hand component and one left-hand component wherein the left-hand component is of a magnitude greater than the right-hand component. The right-hand elliptically-polarized radiation of code 2 is composed of two circularly-polarized components, e.g. a left-hand component and a right-hand component, wherein the right-hand component is of a magnitude greater than the left-hand component.

During the time when code 1 is being transmitted by radiating elements 49 and 50 the left-hand circularly-polarized antenna 60 receives the strong left-hand circularly-polarized component of the left-hand elliptically-polarized radiation which component is fed to the receiver-indicator apparatus of FIG. 8 and which is stored in integrator store 99. During the time when code 2 is being transmitted by radiating elements 54 and 55, the left-hand circularly-polarized antenna 60 receives the weak left-hand circularly-polarized component of the right-hand elliptically-polarized radiation which component is fed through the receiver-indicator apparatus of FIG. 8 and which is stored in integrator store 100. The strong signal output of the integrator store 100 is then compared with the weak signal output of integrator store 99 in the lateral comparator 104 which in turn mechanically activates the indicator 106. Again, the needle 106 gives a direct reading to indicate the vehicle's rightward deviation from the beam-axis plane 25 of FIG. 7.

Although the operation of this embodiment of the invention has been described with reference only to the transmitter portion of FIG. 7 it is to be understood that another transmitter portion (not shown) is also used in conjunction with the receiver-indicator apparatus of FIG. 8 to indicate deviations of the vehicle vertically with respect to a second beam-axis plane. This second transmitting apparatus will transmit radiation in codes 3 and 4 in a manner similar to that of the apparatus of FIG. 7 and in such a way as to indicate deviations up or down with respect to the desired beam-axis plane.

By using the embodiment shown in FIGS. 7 and 8 the receiving system can be reduced considerably in size, weight and cost.

This arrangement has the distinct advantage over the receiver of FIG. 3 in that the need for keeping the gain accurately balanced in the two receiving channels of FIG. 3 is completely eliminated.

Many modifications and variations of this invention are possible. For example, another embodiment of this invention could employ a scanning beam. Scanning can be accomplished by inserting a variable phase shifter in the feed line to one transmitting element. In this case, a special synchronizing code could be transmitted at the beginning of each scan to synchronize the video processor and indicator in the receiver. The width of sector that could be scanned without producing ambiguous readings of deviation angle would be roughly one half of the nonambiguous coverage that can be accommodated by a fixed beam. The airborne receiver would not have to measure signal ratios to determine deviation angle, but would simply have to identify the point at which the right-hand and left-hand circularly-polarized signal components were of equal amplitude, i.e. linear polarization, and then measure the deviation angle as a function of elapsed time from the start of the scanned sweep. This embodiment would lend itself to an accurate calibration of deviation angle on the airborne receiver without precautions against variation of signal level due to range, and without regard to the ellipticity ratio of the receiving antenna units.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A radio polarization guidance system, comprising:
   means for transmitting at least a pair of orthogonally-oriented, linearly-polarized radio waves;
   said transmitting means including at least two active orthogonally-oriented radiating elements;
   receiving and indicating means for receiving said radio waves and for indicating the instantaneous characteristics thereof;
   said receiving and indicating means including means for indicating directly the direction and amount of deviation from a median spatial region.

2. The system of claim 1 wherein said receiving and indicating means comprises:
   amplitude comparator means; and
   at least one right-hand, circularly-polarized antenna and at least one left-hand, circularly-polarized antenna, wherein each of said antennas is operatively associated with said amplitude comparator means to measure the difference in the amount of energy received by each of said antennas.

3. The system of claim 2 including:
   filtering means respectively coupled to each of said circularly-polarized antennas to filter the outputs thereof;
   detector means respectively coupled to each of said filtering means to detect the filtered outputs thereof;
   amplifying means respectively coupled to each of said detector means to amplify the outputs of said detector means; and
   wherein each of said amplifying means is operatively coupled to said amplitude comparator means to measure the difference in the amount of energy received by each of said antennas.

4. The system of claim 1 including:
   means for transmitting more than one pair of said radio waves on a time-sharing basis.

5. The system of claim 4 wherein said receiver and indicating means includes triggering means for triggering an event when the resultant of said radio waves is defined by a predetermined characteristic.

6. The system of claim 5 wherein said transmitting means includes:
   switching means; and
   at least two pairs of orthogonally-oriented radiating elements, operatively associated with said switching means,
   wherein said switching means alternately allows energization of said pairs of radiating elements on a time-sharing basis to produce resultant radio waves having a predetermined polarization characteristic within a median spatial region, any point in said region being an equal distance from each of said radiating elements in each of said pairs of radiating elements, and different predetermined polarization characteristics without said median spatial region than said predetermined polarization characteristic within said median spatial region;
   wherein said different predetermined polarization characteristics without said median spatial region vary with the direction and amount of deviation from said median spatial region; and
   wherein said different predetermined polarization characteristics without said median spatial region vary depending upon which of said pairs of orthogonally-oriented radiating elements is energized.

7. The system of claim 6 wherein said transmitting means includes means for energizing each of said radiating elements in each of said pairs of radiating elements with energy which is in phase and is of equal amplitudes.

8. The system of claim 7 wherein said orthogonally-oriented radiating element pairs are operatively associated with said transmitting means to alternately produce, when energized, resultant linearly-polarized radio waves within said median spatial region, and resultant elliptically-polarized radio waves of opposite rotational sense without said median spatial region,
   said elliptically-polarized waves varying in the amount of ellipticity and the sense of rotation with the direction and amount of deviation from said median spatial region.

9. The system of claim 8 wherein said receiver-indicator means includes:
   antenna means; and
   means operatively associated with said antenna means for triggering an event when said antenna means is illuminated by said linearly-polarized radio waves located within said median spatial region.

10. The system of claim 8 wherein said antenna means include at least one circularly-polarized antenna.

11. The system of claim 5 wherein said transmitting means comprises:
    a pulse modulated transmitter;
    two pairs of orthogonally-oriented, linearly-polarized radiating elements; and
    switching means operative to alternately energize said pairs of radiating elements with energy from said transmitter on a time-sharing basis.

12. The system of claim 1, including:
    means for transmitting at least four pairs of said orthogonally-oriented, linearly-polarized radio waves on a time-sharing basis to form resultant radio waves having predetermined characteristics.

13. The system of claim 12 wherein said transmitting means includes:
    switching means; and
    at least four pairs of orthogonally-oriented radiating elements operatively associated with said switching means to produce resultant radio waves having similar predetermined polarization characteristics within at least two median spatial regions, any point in one of said regions being an equal distance from each of the said radiating elements in two of said pairs of radiating elements, and any point in a second of said regions being an equal distance from each of said radiating elements in two other of said pairs of radiating elements.

14. The system of claim 13 wherein said transmitting means includes means for energizing each of said radiating elements in each of said pairs of radiating elements with energy which is in phase and is of equal amplitudes.

15. The system of claim 14 wherein said transmitting means includes means for energizing each of said pairs of radiating elements with energy characterized by different codes for each of said radiating element pairs.

16. The system of claim 13 wherein said receiver-indicator means includes:
    antenna means; and
    indicator means operatively associated with said antenna means for simultaneously indicating the direction and amount of deviation from at least two of said median spatial regions.

17. The system of claim 16 wherein said antenna means includes at least one circularly-polarized antenna.

18. The system of claim 17 wherein said receiver-indicator means further includes:
    receiver means operatively coupled to said antenna means;
    decoder means operatively associated with said receiver means; and
    comparator means operatively associated with and between said decoder means and said indicator means.

19. The system of claim 18 including:
    at least four gate generators operatively connected to said decoder;
    at least four gated emitter followers individually coupled to said gate generators; and
    at least four integrator stores individually connected to said gated emitter followers and to said comparator means.

20. The system of claim 19 including:
delay line means operatively associated with and between said receiver means and said gated emitter followers.

21. The system of claim 20 wherein said decoder is a four-code decoder.

22. The system of claim 13:
wherein said pairs of radiating elements are operatively associated with said switching means to produce resultant radio waves having different predetermined polarization characteristics without said median spatial regions than said similar predetermined polarization characteristics within said median spatial regions;

wherein said different predetermined polarization characteristics without said median spatial regions vary with the direction and amount of deviation from said median spatial regions; and wherein said different predetermined polarization characteristics without said median spatial regions vary depending upon which of said pairs of orthogonally-oriented radiating elements is energized.

23. The system of claim 22 including:
pulse code modulator means operatively coupled to said switching means to produce resultant linearly-polarized radio waves within said median spatial regions, and resultant elliptically-polarized radio waves without said median spatial regions, said elliptically-polarized waves varying in the degree of ellipticity with the amount of deviation from said median spatial regions and said elliptically-polarized waves varying in the sense of rotation depending upon which of said pairs of orthogonally-oriented radiating elements is energized and the direction of deviation from said median spatial regions.

References Cited
UNITED STATES PATENTS

| 1,863,518 | 6/1932 | Young | 343—100 |
|---|---|---|---|
| 2,473,613 | 6/1949 | Smith | 343—100 |
| 2,502,394 | 3/1950 | Smith | 343—100 |
| 2,532,428 | 12/1950 | Smith | 343—100 |
| 2,613,349 | 10/1952 | Kandoian | 343—100 |
| 2,312,093 | 2/1943 | Hammond | 343—100 |
| 2,616,640 | 11/1952 | Bedford et al. | 343—108 |
| 2,822,540 | 2/1958 | Butler | 343—100 |
| 2,935,596 | 2/1960 | Zisler | 343—100 |

RODNEY D. BENNETT, *Primary Examiner.*

H. C. WAMSLEY, *Assistant Examiner.*